2,934,176

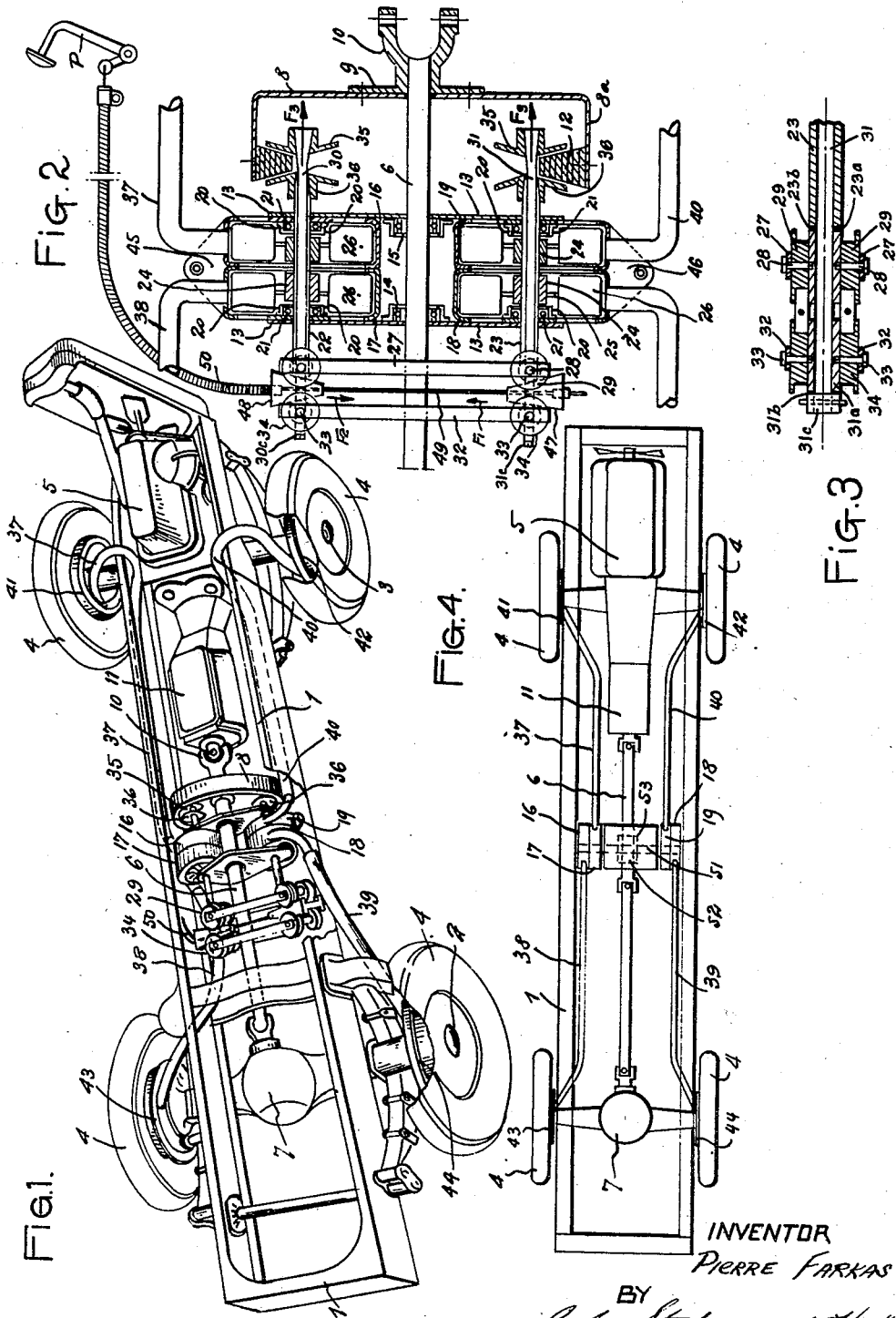

BRAKING SYSTEMS FOR MOTOR VEHICLES

Pierre Farkas, Boulogne-Billancourt, France

Application May 23, 1955, Serial No. 510,301

Claims priority, application France May 25, 1954

1 Claim. (Cl. 188—264)

In view of the increasing speeds of modern motor vehicles and also of the fact that the dimensions of the tires of said vehicles are generally increasing, it has become a difficult problem to evacuate the heat given off by braking.

Many devices have been proposed to solve this problem but, up to now, no fully satisfactory solution has been found.

The object of the present invention is to provide a braking system which overcomes the difficulties experienced in practice.

For this purpose, according to my invention, at least one brake of the vehicle (as a rule all the brakes mounted on the wheels thereof) is cooled by air supplied thereto through conduit means from a fan, this fan being coupled with the propeller shaft of said vehicle through means operated when the above mentioned brake is being applied, whereby on the one hand the efficiency of said brake is improved by the air cooling thereof and on the other hand, this fan constitutes a supplementary braking element acting on the propeller shaft owing to the power it requires to force cooling air toward the brake.

Preferred embodiments of my invention will be hereinafter described with reference to the accompanying drawings, given merely by way of example and in which:

Fig. 1 is a perspective view of the frame of a motor vehicle provided with a braking system according to my invention.

Fig. 2 is an axial sectional view of the fan device and of the means for coupling said fan with the propeller shaft of the vehicle.

Fig. 3 is a part sectional view on the line 3—3 of Fig. 2.

Fig. 4 is a plan view of a motor vehicle provided with a braking system made according to a modification.

Referring first to Figs. 1 to 3, the frame 1 of the vehicle, which rests upon the front and rear wheels 2 and 3 provided with tires 4, supports an engine 5. This engine is connected through a propeller shaft 6 with the rear axle 7. A disc 8 is fixed on a plate 9 rigid with the yoke of the universal joint connecting said shaft 6 with gear box 11. This disc 8 is provided with a cylindrical flange 8a which carries an annular part 12 of trapezoidal cross section. This part 12 is made of a material having a good friction coefficient such as used for instance for brake linings.

A casing 13 is mounted on shaft 6 with the interposition of ball bearings 14—15. In this casing 13 are mounted four fan casings 16, 17, 18 and 19 disposed in pairs on opposite sides of shaft 6. Each of said casings 16, 17, 18 and 19 carries the outer race of a ball bearing 20—21. Two tubular shafts are journalled in these ball bearings in such manner as to be able to slide in the axial direction with respect thereto. The tubular shaft extending through casings 16 and 17 is designated by reference numeral 22 and that extending through casings 18 and 19 is designated by reference numeral 23. Said tubular shafts 22—23, in which two shafts 30—31 respectively coaxial therewith are slidable, carry hubs 24 fixed thereon and on which are fixed arms 25 rigid with fan blades 26. The clearance of said plates 26 in their respective fan casings is sufficient to permit a small displacement of said blades, together with the corresponding shaft 22 or 23, with respect to said casings.

Tubular shafts 22—23 support a structure including horizontal arms 27 with respect to which said tubular shafts can rotate freely but which are longitudinally fixed with respect to said shafts. This structure includes sleeves, such as 23$_a$, each mounted free to rotate on the corresponding inner shaft 31 and bearing, with the interposition of an antifriction ring 23$_b$, against the left hand edge of the corresponding tubular shaft 23. Arms 27 are mounted on vertical spindles 28 carried by sleeve 23$_a$ and on which rollers 29 are freely rotatable.

Shafts 30—31 support a structure including horizontal arms 32 in which said shafts 30—31 can rotate freely but which are fixed longitudinally with respect to said shafts. This last mentioned structure (arms 32) includes sleeves, such as 31$_a$, each mounted free to rotate on the correponding inner shaft 31 and bearing, with the interposition of an antifriction ring 31$_b$, against a shoulder formed by an extension 31$_c$ of shaft 31 rigid therewith. Arms 32 are mounted on vertical spindles 33 carried by sleeve 31$_a$ and on which rollers 34 are freely rotatable.

The axis of each roller 34 has its axis located in the same vertical plane, parallel to shaft 6, as the axis of the corresponding roller 29.

Wedge-shaped elements 47 and 48 are interposed between each of said rollers 34 and the corresponding roller 29. Wedge-shaped member 47 is fixed to one end of a cable 49 whereas wedge-shaped member 48 is fixed to the corresponding end of a flexible sheath 50 surrounding this cable. The other ends of said cable and said sheath are operatively connected to the brake control member so that when the brakes are applied the first mentioned ends of said cable and said sheath are urged toward each other.

The ends of the shafts 30—31, located on the other side of the fan casing 13 from said rollers 34, carry, fixed thereon, conical flanges 35 adapted to cooperate with one side of annular member 12. The corresponding ends of shafts 22—23 carry, fixed thereon conical flanges 36 disposed opposite flanges 35 and adapted to cooperate in clutch-like manner with the other side of annular member 12.

The casings of fans 16, 17, 18 and 19 are connected through pipes 37, 38, 39, 40, with the four brakes 41, 42, 43, 44 of the vehicle.

The last mentioned fan casings are secured to the vehicle frame by means of fixation plates 45—46.

The above described braking system works as follows.

When the driver of the vehicle operates brakes 41, 42, 43, 44 by means of the brake control member, that is to say of the brake pedal P, he simultaneously pulls cable 49 into sheath 50, which causes wedge-shaped members 47 and 48 to be moved toward each other. The wedging action of said members 47 and 48 on rollers 34 and 29 causes each tubular shaft 22 (or 23) and the corresponding central shaft 30 (or 31) located therein to slide with respect to each other so that flanges 35—36 are tightly applied against the opopsite sides of annular member 12 respectively. This member 12, which is rotating together with propeller shaft 6, therefore drives the above mentioned shafts so that fans 16, 17, 18 and 19 are now coupled with said propeller shaft 6. These fans therefore deliver air, through pipes 37, 38, 39 and 40, to brakes 41, 42, 43 and 44. This air cools the drums and shoes of said brakes.

Braking is thus considerably improved, for two reasons: First the fact that the brakes are cooled increases the efficiency thereof; secondly, due to the fact that a substantial amount of power is absorbed to drive the fans and that a resistance is to be overcome in order to force air from the fans through pipes 37, 38, 39 and 40, the system acts as a supplementary brake on the propeller shaft.

In some cases, annular member 12 may be located on the outside of the flange 8a of disc 8 so as to leave sufficient space around shaft 6 when this is desirable.

Anyway, the area of friction between pulleys 35—36 and annular member 12 is as great as possible in order to absorb the maximum power, and thus to relieve the brakes. Instead of using the whole of the air supplied by the fans to send it into the brakes for cooling purposes, a portion of this air may be sent to the inlet of the air compressor in the case of pneumatic brakes, so as to increase the production of compressed air just when a great amount of air is necessary in order to operate the brakes. Consequently in this case, whereas the output of the compressor is increased at critical times, the energy absorbed from the propeller shaft is also increased, which considerably relieves the brakes.

Fig. 3 shows a modification where the elements similar to those of Fig. 1 are designated by the same reference numerals. In this case, fans 16, 17, 18 and 19 are disposed in the longitudinal direction, i.e. rotate about an axis transverse to this longitudinal direction. They are driven by a shaft 51 carrying a toothed wheel 52 cooperating with an endless screw coupled with propeller shaft 6 through a suitable clutch operated in a manner analogous to that above described, that is to say engaged when the brakes are being operated.

The operation of the device of Fig. 3 is the same as that of Figs. 1 and 2.

When the device above described is mounted on a tractor which is to drive a trailer or a semi-trailer, two or four supplementary fans are provided so as to send cooling air to the brakes of the trailer or semi-trailer. Suitable conduits are provided to connect these supplementary fans with the brakes of the trailer or semi-trailer.

Instead of making use of cable means as shown on Figs. 1 and 2 to control the coupling of the fans with the propeller shaft, I might use fluid control means, for instance compressed air control means; in this case, the clutch is operated by a cylinder containing compressed air and operated simultaneously with the cylinder for operating the brakes. I might also make use of electromagnetic control means.

A braking device according to my invention makes it possible to keep the brakes always very clean since the succession of air jets projected thereto, when the brakes are operated, drives out dust and dirt.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

In a vehicle having four wheels, in combination, a propeller shaft, a brake for each of said wheels, control means for operating said brakes, four air fans, conduit means between the outlet of each of said fans and one of said brakes respectively, for conveying air from said fans to said brakes for cooling thereof, and means operative by said brake control means for coupling said fans with said propeller shaft when said brakes are being operated, said fans being grouped in two pairs disposed respectively on opposite sides of said propeller shaft, a common longitudinal shaft for driving each pair of fans, the means for coupling said fans with said propeller shaft consisting of clutch means interposed between each of said longitudinal shafts and said propeller shaft.

References Cited in the file of this patent

UNITED STATES PATENTS

| 2,356,111 | Weeks et al. | Aug. 15, 1944 |
| 2,378,100 | Pogue | June 12, 1945 |

FOREIGN PATENTS

| 154,836 | Australia | Jan. 20, 1954 |
| 991,425 | France | June 20, 1951 |
| 263,760 | Italy | Mar. 28, 1929 |